United States Patent [19]

Belbin et al.

[11] Patent Number: 4,479,998

[45] Date of Patent: Oct. 30, 1984

[54] PROCESS OF PRODUCING FIBRE-REINFORCED SHAPED ARTICLES

[75] Inventors: Geoffrey R. Belbin, Welwyn; Frederic N. Cogswell, Welwyn Garden City, both of England

[73] Assignee: Imperial Chemical Industries PLC, Hertfordshire, England

[21] Appl. No.: 523,058

[22] Filed: Aug. 15, 1983

Related U.S. Application Data

[62] Division of Ser. No. 341,185, Jan. 20, 1982, Pat. No. 4,399,085.

[30] Foreign Application Priority Data

Jan. 21, 1981 [GB] United Kingdom ............... 8101822

[51] Int. Cl.³ .................. B29C 5/00; B29D 27/00; C08F 47/14
[52] U.S. Cl. .................. 428/220; 428/303; 428/338
[58] Field of Search ............ 428/314.2, 317.9, 220, 428/303, 338

[56] References Cited

U.S. PATENT DOCUMENTS

| | | | |
|---|---|---|---|
| 3,382,302 | 5/1968 | Marzocchi | 428/317.9 |
| 3,383,272 | 5/1968 | Gluck | 428/317.9 |
| 3,916,060 | 10/1975 | Fish et al. | 428/317.9 |
| 4,163,824 | 8/1979 | Saidla | 428/317.9 |
| 4,284,683 | 8/1981 | Hipchen et al. | 428/317.9 |

FOREIGN PATENT DOCUMENTS

| | | | |
|---|---|---|---|
| 2475975 | 8/1981 | France | 428/317.9 |
| 44-469 | 1/1969 | Japan | 428/317.9 |
| 1224471 | 3/1971 | United Kingdom | 428/317.9 |

*Primary Examiner*—William J. Van Balen
*Attorney, Agent, or Firm*—Cushman, Darby & Cushman

[57] ABSTRACT

A process of producing a fibre-reinforced shaped article comprising extruding a composition comprising a settable fluid as a carrier for fibres at least 5 mm in length through a die so that relaxation of the fibres causes the extrudate to expand to form an open fibrous structure with randomly dispersed fibres as the extrudate leaves the die characterized in that the porous extrudate is compressed while the carrier is in a fluid condition into a shaped article. The process enables moulded articles to be formed having a random distribution of fibres the majority of which are at least 5 mm long.

4 Claims, No Drawings

PROCESS OF PRODUCING FIBRE-REINFORCED SHAPED ARTICLES

This is a division of application Ser. No. 341,185, filed Jan. 20, 1982, now U.S. Pat. No. 4,399,085.

This invention relates to a process of producing shaped articles of high strength from fibre-reinforced compositions and to the shaped articles derived from the process.

The use of injection moulding compounds containing glass fibres is well established. The strengths achieved in shaped articles injection moulded from such compounds is surprisingly high in view of the fact that the majority of the glass fibres in the shaped article are less than 0.5 mm in length. It is known that even higher strength could be achieved using considerably longer fibres but these longer fibres, of for example, length 10 mm or more, are not very suitable for use in injection moulding machines because the injection moulding process reduces their length prior to the composition being moulded. The additional benefit of using longer fibres is thereby lost. The use of longer fibres not only increases the resistance to flow but normally results in high orientation in the shaped article so that high strength is only obtained in the direction in which the fibres are oriented.

Various techniques are known for producing shaped articles containing long or continuous fibres but these mainly relate to the impregnation of fibre mats. Not only is this impregnation process difficult at high fibre content when thermoplastics polymers are used, but the resulting product is restricted in its ease and versatility of fabrication.

A process has now been devised for producing reinforced shaped articles containing long fibres having considerably reduced orientation and having high loadings of fibre.

Accordingly there is provided a process of producing a fibre-reinforced shaped article comprising extruding a composition comprising a settable fluid as a carrier for fibres at least 5 mm in length through a die so that relaxation of the fibres causes the extrudate to expand to form an open fibrous structure with randomly dispersed fibre as the extrudate leaves the die and compressing the porous structure produced whilst the carrier is in a fluid condition into a shaped article.

By "settable" we mean that the fluid may be "set" into such a form that it holds the fibre in the random orientation, which occurs on extrusion. Thus, for example, the settable fluid may be a molten thermoplastics material which is extruded in its molten state and then set by cooling until it freezes.

Preferably the extrudate is extruded directly into a mould chamber provided with means for compressing the porous extrudate into a shaped article and the extrudate is compressed into a shaped article before the extrudate is caused or allowed to set.

The extrudate formed in the process contains randomly dispersed fibres so that the only orientation of fibres in the shaped article is that which might arise as a result of the compression process.

The process can be used at high fibre loadings, that is in excess of 50% by weight of fibre although it is also useful at loadings down to 20% by weight of fibre. Little fibre breakage occurs in the process so that shaped articles of exceptionally high strength measured in all directions in the article can be obtained.

The process of extruding the fibre-containing composition into a porous structure is described in U.S. Pat. No. 4,178,411. The essential features of this process are that under the extrusion conditions the settable fluid carrier should have a viscosity sufficiently high to carry the fibres through the die but low enough to allow movement of the fibres as they relax on passing through the confines of the die. Additionally the die geometry should be such that as the composition is forced through the die the fibres are unable to move within the fluid to become aligned so that the stresses arising from forcing the randomly dispersed fibres through the die have time to disappear. This relaxation within the die is prevented if the die diameter is greater than the die length. Preferably the die has zero length, that is, is an opening defined by knife edges. Furthermore, the composition must be pushed through the die at a rate which prevents relaxation occurring before the composition reaches the die.

Although the invention is applicable to any fibre-containing settable fluid, it is particularly suitable for forming shaped articles of reinforced thermoplastics compositions because alternative methods of producing such shaped articles with high loadings of long reinforcing fibres are not readily available or are limited in their application.

The invention offers advantages over shaped articles obtained by injection moulding because apart from the difficulty in producing and moulding high fibre content articles containing fibres of average length longer than about 1 mm the resulting injection moulded articles have a significant degree of anisotropy. Mould costs for the compression process may also be reduced compared with moulds for injection moulding. The provision of shaped articles containing randomly dispersed fibres, with most of the fibres, that is greater than 50% by weight of the fibres, being longer than 5 mm, and, desirably, most being longer than 10 mm, is a particularly important aspect of the invention. The invention also offers advantages over the process of forming articles from fibre-filled sheets in that it is far more versatile for producing, for example, ribbed articles or articles which contain areas of fibre-filled foam. Such versatility can produce lighter articles or lower cost articles. Thus the invention also includes a process in which the porous extrudate is non-uniformly compressed to give a reinforced shaped article in which regions of the article comprise fibre-filled foam. Generally, these regions are contained within at least partially compressed regions so that at least a surface skin of non-foamed reinforced material is present around the foamed regions.

When the composition is a blend of fibre and thermoplastics polymer the composition fed to the extruder may be a simple dry blend or a metered blend of the polymer and fibre but to ensure the provision of a uniform composition it is preferred to use a fibre-filled composition in which the thermoplastics polymer has been intimately distributed over the surface of the filler so that little or no further mixing in the extruder is necessary to obtain a uniform composition so that attrition of the glass fibre is avoided as far as possible. Suitable feedstocks may be obtained by the various processes of impregnating rovings of fibres with melts of thermoplastics polymers. Suitable products can be obtained by impregnating fibre rovings with a melt of the thermoplastics polymer or using a powder of the thermoplastics polymer which is subsequently melted. Typical processes are described in British patent specification No. 1 167 849 and U.S. Pat. No. 3,742,106. The products obtained from these prior disclosures are in the form of continuous laces and may be cut to any desired length. For the purposes of the present invention they should be at least 5 mm long and preferably not longer than 100 m.

Particularly useful feedstocks can be obtained by a process of producing a fibre-reinforced composition comprising drawing a plurality of continuous filaments through a melt of a thermoplastics polymer, having a melt viscosity of less than 30 $Ns/m^2$, preferably between 1 and 10 $Ns/m^2$, to wet the filaments with molten polymer, the filaments being aligned along the direction of draw.

Another useful feedstock can be produced by a process of producing a fibre-reinforced composition comprising tensioning and aligning a plurality of continuous filaments to provide a band of contiguous filaments, passing the band over a heated spreader surface so as to form a nip between the band and the spreader surface, maintaining a feed of a thermoplastics polymer at the nip, the temperature of the spreader surface being sufficiently high to give a polymer melt of viscosity capable of wetting the continuous filaments as they are drawn over the spreader surface. Whilst it is preferred that the polymer melt in the cusp of the nip has a viscosity of less than 30 $Ns/m^2$, a high back tension on the filaments fed to the spreader surface will ensure that polymer impregnation in the nip area is favoured, so that it is possible to produce a well impregnated band at a significantly higher viscosity than 30 $Ns/m^2$. Thus this process provides a means of maximising the molecular weight of the polymer that may be used in a thermoplastics polymer pultrusion process.

The virtue of the products obtained from the latter two processes is that the reinforcing fibres are exceptionally well wetted with the result that subsequent processing of these products in the extrusion step of the process results in minimal breakdown of reinforcing fibre because the individual filaments in the products are cocooned in polymer. This property also protects the fibres in the subsequent compression step so that fibre breakage is minimised. The fibre-reinforced feedstocks containing high concentrations of fibre should be conveyed along the extruder to the die using a screw which causes the minimum of fibre attrition or using a reciprocating ram. The polymer of the composition must be heated to a fluid condition so that the fibres are free to recover from their stressed condition on being forced through the die.

The invention is further illustrated with reference to the following example.

EXAMPLE 1

A continuous glass roving impregnated with polyethylene terephthalate of intrinsic viscosity 0.3 was prepared by passing the roving, consisting of 16,000 individual filaments, through a melt of the polymer whilst the roving was spread by passing it over a bar situated in the polymer melt. The impregnated roving was consolidated by pulling it through a 3 mm diameter die in the wall of the melt bath. The product contained 65% by weight of glass.

The roving was chopped to give glass fibres of length L as recorded in the Table below. The chopped roving was fed to the barrel of a ram extruder 25 mm in diameter maintained at a temperature of 280° C. The product was discharged through an orifice of diameter D (as recorded in the Table below) at a rate of 0.5 ml/sec into a vertical flask mould. The extrudate was a low density foam as described in U.S. Pat. No. 4,178,411 with randomly oriented fibres. The foam produced was compacted in the mould to give a sheet 3 mm thick. The sheet was tested in flexure at two directions at right angles and its stiffness compared with other typical sheet products. The sheet was also tested in impact and the energy to initiate fracture and to total failure were recorded.

TABLE 1

| Wt % glass | Length L mm | Diameter D mm | Stiffness $GN/m^2$ 0° | Stiffness $GN/m^2$ 90° | Impact Energy (J) Initiation | Impact Energy (J) Propagation |
|---|---|---|---|---|---|---|
| 65 | 12 | 2 | 10.2 | 10.2 | 1.2 | 4.5 |
| 65 | 50 | 10 | 10.4 | 12.2 | 3.3 | 8.8 |
| 50 | 50 | 10 | 9.2 | 9.6 | 4.0 | 12.3 |
| A* | | | 9.4 | 6.6 | 2.0 | 10.6 |
| B** | | | 5.2 | 5.5 | 7.5 | — |
| C*** | | | 6.5 | 3.8 | 6.1 | — |

A*Glass-reinforced nylon sheet injection moulded from 'Maranyl' A190 containing 30% by weight of glass fibres in nylon 66.
B**Glass-reinforced polypropylene sheet (40% by wt glass) sold under the trade name 'Azdel' by PPG Industries Inc.
C***Glass-reinforced nylon sheet (40% by wt glass) sold under the trade name STX250 by Allied Chemicals.

The ratio of stiffness values indicates much less anisotropy in the case of the sheet prepared according to the invention compared with the injection moulded product.

EXAMPLE 2

Polyetherether ketone having a melt viscosity at 380° C. of 12 $Ns/m^2$ was pultruded with 63% by weight of continuous glass fibre by pulling the roving through a bath of the melt at 380° C. and subsequently through a die to give a roving 3 mm diameter. This roving was chopped to give chips 10 mm long which were fed to the 25 mm diameter barrel of a ram extruder and heated to 380° C. The product was then discharged through an orifice 5 mm in diameter to give a low density foam similar to that described in Example 1. The foam was then compacted in a mould to give a consolidated sheet 3 mm thick.

The sheet was isotropic in plane and had the following properties:

| | Standard Deviation |
|---|---|
| Flexural tests | |
| Flexural modulus 15 $GN/m^2$ | (2) |
| Flexural strength 170 $MN/m^2$ | (50) |
| Instrumented falling weight test | |
| Impact initiation 9.5 J | (2) |
| Energy to failure 22 J | (2) |

EXAMPLE 3

Example 2 was repeated except that the fibre concerned was carbon fibre and the final roving contained 59% by weight of carbon fibre. The 3 mm sheet formed by compression was isotropic in plane and had the following properties.

| | Standard Deviation |
|---|---|
| Flexural tests | |
| Flexural modulus 25 $GN/m^2$ | (2) |
| Flexural strength 200 $MN/m^2$ | (30) |

| | Standard Deviation |
|---|---|
| Instrumented falling weight impact | |
| Impact initiation 2 J | |
| Energy to failure 7 J | |

EXAMPLE 4

A Turner CTA-2-80S injection moulding machine with a 50 mm screw and having a shot size of about 75 g was modified so that the orifices in the hexagonal point web of the check valve were doubled in cross-sectional area. The injection nozzle had a diameter of 4 mm and was tapered sharply so that the land length was effectively zero. The mould used was a "flower pot" mould having a height to open diameter ratio of 1:2 and having a wall thickness of 2 mm.

Glass-filled PET compositions prepared as in Example 1 and having a granule length of 10 mm were used as the feedstock and injected at barrel and die temperatures of 280° C. into the mould in an open position, i.e. with the walls separated by 20-30 mm. After injecting at maximum rate into the open mould the mould was closed with maximum locking force. A smooth surfaced flower-pot was obtained, the polyester being in the amorphous state. The pot was held at 150° C. to crystallise the polymer. The dimensions of the base, open top and walls after crystallisation were compared with those when amorphous for pots made from compositions containing 30% and 50% by weight of glass respectively. No significant changes are observed.

The glass fibre content in various positions in the pot were determined for each of the two compositions used. The results indicated uniform flow of the glass in the process of forming the pot.

The glass fibre length and distribution in the flower pot were assessed by ashing 1 g samples, cut from the pot, so that the polymer was burnt without breakage of the fibre. The matted fibre produced was placed in a polyethylene bag and gently teased out to a loose fluff. The bag was inflated to contain about 500 ml of air and the bag was then gently shaken for several minutes. A small deposit of short fibres appeared at the bottom of the bag. The loose fluff was transferred to a second bag and the procedure repeated. On the second occasion there was no further significant separation of short fibres.

The short fibre fraction was weighed and examined in an optical microscope. Most of the fibres were less than 1 mm with the occasional fibre being up to 10 mm long. The weight fraction of these small fibres varied between 3 and 7% on 4 samples taken from different regions of the pot. The loose mat was also optically examined and found to contain most of its fibres at the same length as the original feed granules (10 mm) with very few less than 5 mm long.

The mechanical properties of the mouldings (at various glass contents) were examined by measurement of flexural modulus by Dynamic Mechanical Analysis on samples cut from the base of the pot in directions considered as radial and transverse in a normal injection moulding. The impact strength was measured on sections cut from the side wall using instrumented falling weight tests. All samples were 2 mm thick.

TABLE 2

| Wt % fibres | Resin IV | Flexural Modulus GN/m$^2$ | | Impact Energy (J) | |
|---|---|---|---|---|---|
| | | Radial | Transverse | Initiation | Failure |
| 30 | 0.35 | 6.7 | 4.4 | 1.3 (0.2) | 3.4 (0.4) |
| 50 | 0.28 | 11.2 | 7.6 | 1.5 (0.4) | 5.2 (1.1) |
| 58 | 0.28 | 15.5 | 10.3 | 1.7 | 4.9 |

EXAMPLE 5

PET of IV 0.3 was pultruded with glass fibre to give a 2.5 mm diameter roving of 60% by weight glass in PET. This roving was chopped to give 10 mm sections and blended with unfilled PET of different molecular weights. The samples were then dried and fed to the injection moulding machine and coined as described in Example 4 to give amorphous mouldings. Some of the mouldings were subsequently crystallised by heating them to 150° C. for one hour. The sample thickness in the side was varied in two ways:

1. by off-setting the centre line of the mould so that one side was thick and the other thin, and
2. by altering the volume of the short injected before closing the mould, higher shot weights giving thicker parts.

Samples were cut from the side wall to give different thicknesses so that the effects of different molecular weights, different copolymers, different glass contents and different thicknesses could be determined in the instrumented falling weight impact test.

The effect of different molecular weight and different copolymer content was evaluated by blending in the following unfilled polymers so that the glass content of the moulding was reduced to 40% by weight.

| Additive polymers | Designation |
|---|---|
| PET IV 0.3 | low molecular weight |
| PET IV 0.6 | medium molecular weight |
| PET IV 0.9 | high molecular weight |
| PET copolymer containing 20% isothalic acid IV 0.6 | copolymer |

TABLE 3

| | | Comparison of samples containing 40% by weight glass (amorphous mouldings) | | | | | |
|---|---|---|---|---|---|---|---|
| | | Impact Energy (J) | | | | | |
| | | at 1.5 mm thick | | at 2 mm thick | | at 3 mm thick | |
| Wt % glass | Designation | Initiation | Failure | Initiation | Failure | Initiation | Failure |
| 40 | Low molecular weight | 0.7 | 2.8 | 1.4 | 5.0 | 3.0 | 9.5 |
| 40 | Medium molecular weight | 1.1 | 4.0 | 1.8 | 6.2 | 3.2 | 10.5 |
| 40 | High molecular weight | 1.0 | 3.8 | 1.7 | 6.0 | 3.6 | 12.0 |
| 40 | Copolymer | 1.0 | 3.2 | 1.8 | 5.5 | 3.6 | 12.0 |

An undiluted sample containing 60% by weight glass (amorphous moulding) gave the following values.

TABLE 4

| | Impact Energy (J) | | | | | |
|---|---|---|---|---|---|---|
| | at 1.5 mm thick | | at 2 mm thick | | at 3 mm thick | |
| | Initiation | Failure | Initiation | Failure | Initiation | Failure |
| A | 1.3 | 4.8 | 2.0 | 7.5 | 4.0 | 14.0 |

A = Low molecular weight.

A sample of the high molecular weight designated material containing 40% by weight of glass was crystallised.

TABLE 5

| | Impact Energy (J) | | | | | |
|---|---|---|---|---|---|---|
| | at 1.5 mm thick | | at 2 mm thick | | at 3 mm thick | |
| | Initiation | Failure | Initiation | Failure | Initiation | Failure |
| B | 0.8 | 3.4 | 1.3 | 5.0 | 2.8 | 9.5 |

B = High molecular weight crystallised.

All results have a coefficient variation of 10%.

The results indicate that impact resistance increases with thickness (an exponent of 1.5 is appropriate); that there is a small improvement in impact resistance with molecular weight; that copolymers have higher impact resistance; that crystallised samples have less impact resistance; and that the glass content is the most important factor.

EXAMPLE 6

Fibre foam was prepared from a screw extruder and ejected from a nozzle as described in Example 4. The foam was then transferred hot to a mould at 160° C. and compression formed into a rectangular open box having a 3 mm wall thickness. The samples were crystalline and had the following properties, sample designation being the same as in Example 4.

TABLE 6

| Wt % glass | Designation | Impact Energy (J) | |
|---|---|---|---|
| | | Initiation | Failure |
| 40 | Medium molecular weight | 2.5 | 7 |
| 40 | High molecular weight | 3.0 | 9 |
| 40 | Copolymer | 3.0 | 7 |

There energies are the same as those expected for a crystallised sample based on Example 5 and the results demonstrate that the strength of these samples is not dependent on the particular moulding studied.

EXAMPLE 7

PET containing short glass fibre was injection moulded into a hot closed disc mould 3 mm thick. When tested by instrumented falling weight impact the failure energies of the crystalline samples were as follows:

| | Failure energy (J) |
|---|---|
| 30% by weight glass | 4.8 |
| 45% by weight glass | 5.3 |

By inference 40% short glass fibre would have a failure energy of 5J which compares with a typical value of 9J for fibre foam coined materials.

CONTROL EXAMPLE A

The feedstock used in Example 4 was injection moulded in a "normal" closed mould. While in some cases it was possible for good impact properties to be achieved, particularly in large flat mouldings, we found that the use of narrow restricted gates often caused the fibres to be constrained together into clumps which clumps then did not mix well and that in some cases the clumps became strongly oriented giving local weakness.

Using the same technique as described in Example 4 we estimated the fibre distribution of this "normal" injection moulding as having an average length of less than 30% by weight of short fibres less than 1 mm and more than 70% by weight of long fibres having an average length of 5 mm or more.

By comparison the distribution of fibres in foam coined moulding according to the invention is less than 10% by weight of short fibres having an average length of less than 1 mm and greater than 90% by weight of long fibres having a length of 5 mm or more.

EXAMPLE 8

Using the process outlined in Example 4 above but using different melt temperature the following compositions containing 60% by weight of fibre, were foam coined. Impact properties measured by the Instrumented Falling Weight test are recorded in the Table below:

TABLE 7

| | Impact Energy (J) | | | |
|---|---|---|---|---|
| | at 6 mm thick | | at 3 mm thick | |
| Composition | Initiation | Failure | Initiation | Failure |
| Carbon fibre/PEEK | 9.6 | 23 | 3.4 | 8.1 |
| Glass fibre/PEEK | 16 | 55 | 5.7 | 19.4 |
| Glass fibre/PPS* | 13 | 58 | 4.6 | 20.5 |
| Glass fibre/PET | 8.1 | 24 | 2.9 | 8.5 |

*PPS = polyphenylene sulphide.

We claim:

1. A reinforced, non-porous shaped article comprising a thermoplastic polymer and at least 20% by weight of randomly dispersed reinforcing filaments in which the individual filaments are substantially completely wetted by the polymer, at least 50% by weight of the filaments are at least 5 mm long, with no filaments longer than 50 mm, the article being isotropic in at least two dimensions.

2. A reinforced, non-porous shaped article according to claim 1 in which at least 50% by weight of the filaments present are at least 10 mm long.

3. An extruded, moulded, compacted, fibre-reinforced shaped sheet comprising a thermoplastic polymer and at least 50% by weight of fibres randomly and uniformly dispersed throughout the polymer, the length of at least 50% by weight of the fibres being in the range 10 mm–50 mm.

4. A shaped sheet as in claim 3 having a thickness up to 6 mm.

* * * * *